Jan. 18, 1944.   F. S. SMITH   2,339,735
APPARATUS FOR THE TREATMENT OF FLOUR AND THE LIKE
Filed July 25, 1941   3 Sheets-Sheet 1

INVENTOR
FRANKLIN S. SMITH
BY
William T. Kriesmer
ATTORNEY

Jan. 18, 1944. F. S. SMITH 2,339,735
APPARATUS FOR THE TREATMENT OF FLOUR AND THE LIKE
Filed July 25, 1941 3 Sheets-Sheet 2
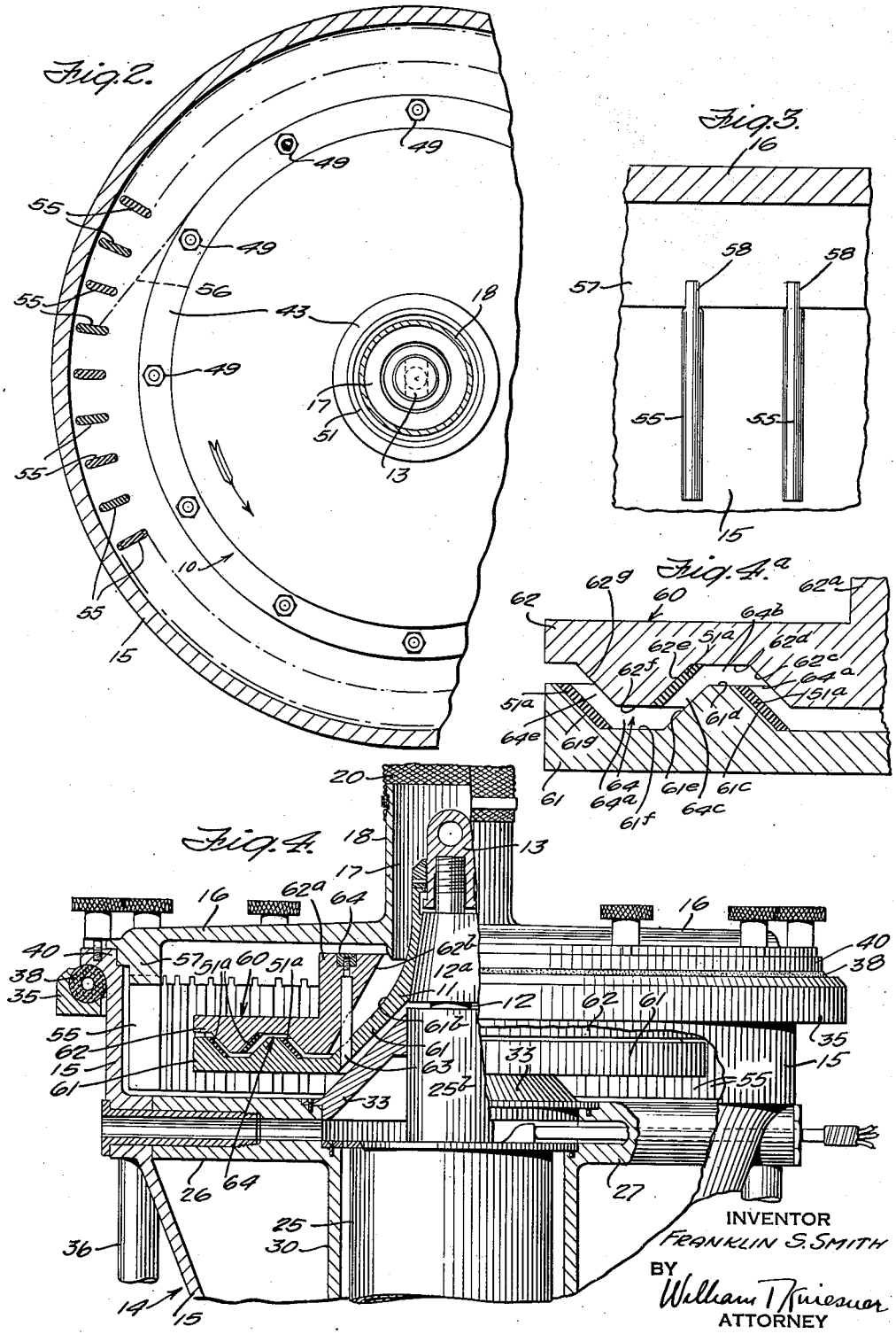
INVENTOR
FRANKLIN S. SMITH
BY
William T. Kiesner
ATTORNEY Jan. 18, 1944.　　　　F. S. SMITH　　　　2,339,735
APPARATUS FOR THE TREATMENT OF FLOUR AND THE LIKE
Filed July 25, 1941　　　3 Sheets-Sheet 3

INVENTOR
FRANKLIN S. SMITH
BY
William T. Kiesner
ATTORNEY

Patented Jan. 18, 1944

2,339,735

UNITED STATES PATENT OFFICE 2,339,735

APPARATUS FOR THE TREATMENT OF FLOUR AND THE LIKE

Franklin S. Smith, Bethany, Conn.

Application July 25, 1941, Serial No. 403,946

10 Claims. (Cl. 21—61)

This invention relates to a method and apparatus for the treatment of milled and other products in bulk, such as flour, for the destruction of life in the forms of insect infestation that may be contained in such products.

In my co-pending applications, Serial Numbers 296,543, filed September 26, 1939; 296,544, filed September 26, 1939; 321,680, filed March 1, 1940; 345,715, filed July 16, 1940; 372,954, filed January 3, 1941 and 395,030, filed May 24, 1941, I have disclosed various forms of apparatus suitable for destroying the life in the forms of insect infestation contained in such products and which may be present therein in various of its stages, such as in the form of eggs, larvae, pupae, or adults; in such apparatus I effect movement of the particles of the product and of the forms of insect life in curved paths to cause them to set up centrifugal forces and to effect coactions with the apparatus to bring about a life-destroying mutilation of the forms of insect life. I have found that, with such apparatus whose treating units are capable of various physical embodiments such as those illustratively shown in the aforesaid applications, it is possible, under suitable circumstances, to cause the apparatus also to break up and hence "mill" the product particles by coactions similar or analogous to those which effect a life destroying mutilation of the forms of insect life, particularly with certain kinds of product and particularly where the forces that are made effective upon both product particles and forms of insect life are greater than is necessary to effect destruction of life in the insect forms.

To more effectively guard against breaking up or milling of the product, and particularly where the product particles are of sizes and characteristics such as those of corn meal, farina, semolina and the like, is one of the dominant aims of this invention. Accordingly, one of the objects of this invention is to provide an improved method and apparatus for treating products such as those above mentioned for the destruction of the life and the forms of insect infestation contained therein, but without material risk of breaking up or milling the product particles themselves. Another object is to provide a simple, practical and inexpensive apparatus of the above mentioned character in which breaking up or milling of product particles, particularly where the product is of the character of farina, corn meal and others, may be dependably avoided while insuring dependable destruction of life in the forms of insect infestation. Another object is to improve the functioning of apparatus of the character disclosed in my above mentioned co-pending application. Another object is to achieve dependable life destroying action on forms of insect infestation at lower speeds of rotation of the rotary treating unit, and, by making it possible to operate the apparatus at lower peripheral velocities, to achieve other practical advantages. Other objects will be in part obvious or in part pointed out hereinafter:

The invention, accordingly, consists in the features of construction, combinations of elements, arrangements of parts and in the several steps and relations and order of each of the same to one or more of the others, all as will be illustratively described herein, and the scope of the application of which will be indicated in the following claims.

In the accompanying drawings in which are shown various possible embodiments of the mechanical features of my invention, Figure 1 is a front elevation of one form of apparatus, certain parts being broken away and certain other parts being shown in central vertical section;

Figure 2 is a horizontal sectional view as seen along the line 2—2 of Figure 1;

Figure 3 is a fragmentary elevation, partly in section, as seen along the line 3—3 of Figure 1;

Figure 4 is a view like that of Figure 1, with certain parts omitted, showing another form of apparatus;

Figure 4a is a detached fragmentary view on an enlarged scale showing part of the apparatus of Figure 4;

Similar reference characters refer to similar parts throughout the several views of the drawings.

Figure 1:
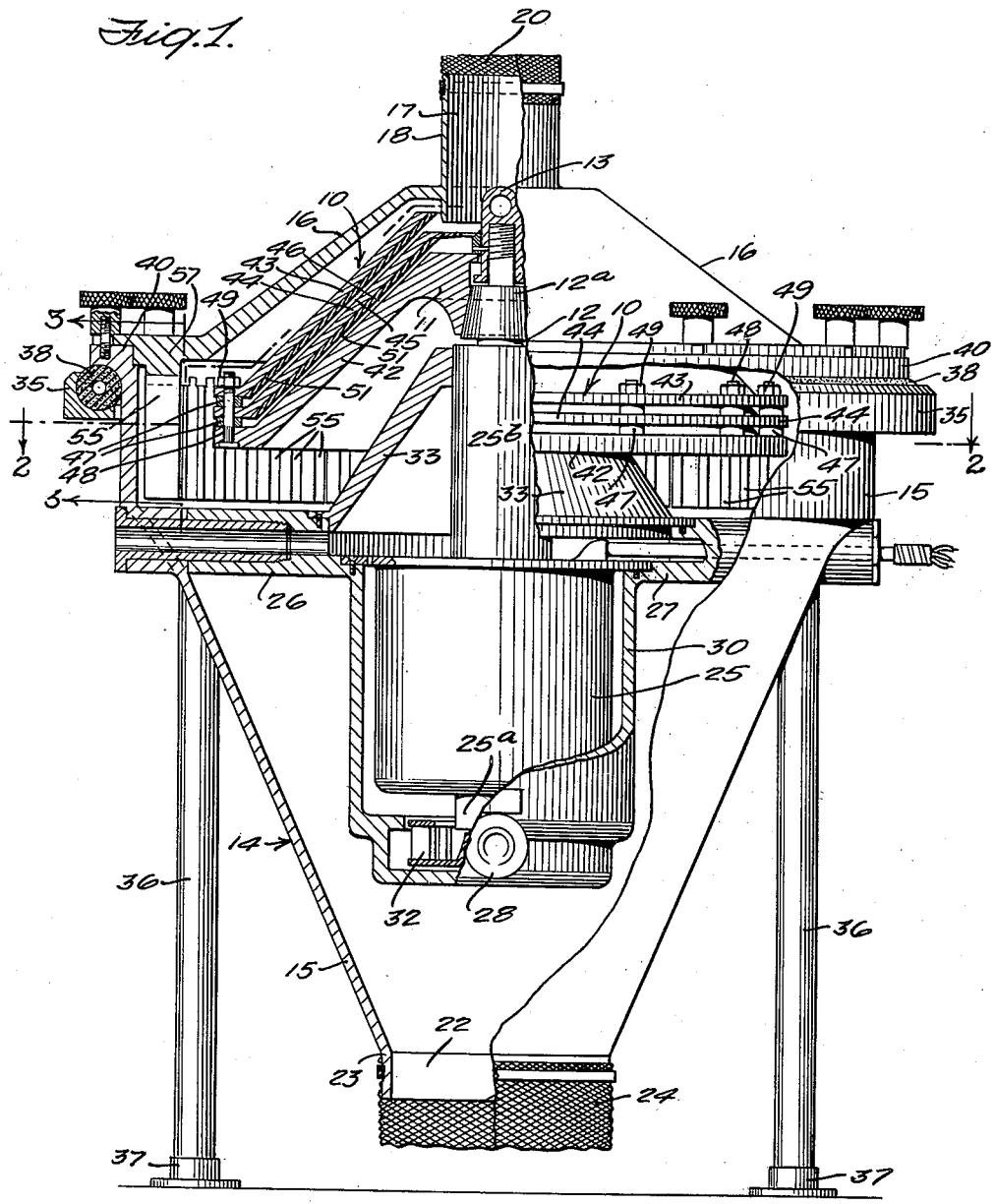

Referring first to Figure 1, I have there shown a rotary product-treating unit, for purposes of illustration, embodying certain of the principles of action disclosed in my above-mentioned applications, but in structurally and functionally improved form to achieve certain further objects and advantages; in Figure 1 this rotary treating unit is generally indicated by the reference character 10 and is mounted in any suitable way for rotation at suitable speed, preferably by way of a hub 11 interiorly tapered and fitted to and coaxially secured to the tapered portion 12ᵃ of a shaft 12. These parts are secured together in any suitable way, preferably in a manner to permit ease of disassembly and at 13 is generally indicated a sleeve member threaded onto a threaded extension of the shaft 12 and constructed, as described in, for example, my application Serial No. 321,680, to coact with the hub 11 to clamp it onto the shaft or to pull it off for disassembly.

Shaft 12 is preferably supported for rotation about a vertical axis, preferably within a casing-like structure generally indicated by the reference character 14 and preferably comprising several sections, such as the lower section 15 and the upper section 16.

The upper section 16 is provided with an inlet passage 17 formed by a cylindrical flange 18 which extends both externally and internally; to the external portion of the flange 18 may be connected a tubular conduit 20 of suitable flexible material and thereby connect the apparatus to receive the product to be treated, usually from the discharge end of a machine or apparatus forming part of the usual production equipment employed in the milling of the products to be treated. The lower casing section 15 is provided with an outlet passage 22 flanged as at 23 so that a conduit 24 may be connected to it to discharge the treated product from the apparatus for movement onto the next machine or apparatus, such as a bagging or packing machine, or a packer or storage bin.

In the preferred and illustrative form, the treating unit 10 is electrically driven and in such case the shaft 12 preferably comprises the shaft of an electric motor of which the casing is shown in Figure 1 at 25, being provided in any suitable way with suitable bearings, such as combined radial and thrust antifriction bearings, preferably mounted in extensions 25ᵃ and 25ᵇ of the casing 25.

In the illustrative arrangement the motor frame 25 is rigidly secured to and within the casing structure 14 in any suitable way. Preferably, the motor is of the enclosed fan-cooled type and the mounting means for the motor may form part of the air cooling system of the motor, as described in detail in my application Serial No. 296,544. For present purposes, it is sufficient to note that the motor casing 25 is rigidly secured to the lower casing section 15 by two diametrically opposed bracket structures 26, 27 adjacent the upper end of the casing 25 and two diametrically opposed and alined bracket structures 28 in the lower end of the casing. The two pairs of brackets 26—27 and 28 extend along diameters that make an angle to each other of say 90° and the brackets may be secured to or formed integrally with an outer jacket or casing 30 surrounding the motor casing 25 and, with the brackets hollow or tubular, thus form connections or passages from the outside of the apparatus casing 14 to the inside of the jacket casing 30. Air may be impelled through the jacket in any suitable way, as, for example, by means of an air impeller 32 accommodated in the lower portion of the jacket structure and secured to and driven by the lower end of the motor shaft 12. Thus, bracket 26 may serve as an inlet and brackets 28 serve as outlets for the air which absorbs the heat losses in the motor dissipated through the motor casing 25.

A frusto-conical member 33 is interfitted at its lower and outer end with the upper end of jacket 30 and at its upper and inner end is interfitted with the bearing extension 25ᵇ, thus forming a strong brace to transmit to the casing structure 14 strains or thrusts which shaft 12 might exert.

The rotating parts of the apparatus are preferably constructed to be dynamically balanced and, as described in my above-mentioned applications, provision is made for preventing overstressing of parts or causing unsafe vibration or other undesirable effects due to the occurrence of conditions of unbalance arising during operation of the treating unit. Where, as in the illustrative forms in the drawings, the shaft 12 is rigidly supported from the casing structure 14, I preferably support the latter so that it and the internally supported rotating parts may precess when a condition of unbalance arises.

Such a supporting arrangement may comprise a ring-like frame member 35 supported by suitable standards 36 which may be secured to the floor, as at 37, member 35 carrying a resilient or cushioning member 38, illustratively of rubber and preferably in tubular form and resting in a suitable seat that extends around the member 35. The upper peripheral portion of the lower casing section 15 is provided with an outwardly directed peripheral flange 40 having a downwardly facing concave peripheral seat to take the cushioning member 38, the latter being thus interposed between members 35 and 40 and where made of rubber and tubular member 38 is sufficiently thick-walled and of a suitable quality to give the desired resiliency of action and to carry the load without permanent deformation.

The product to be treated enters the apparatus through the inlet passage 17 and by the flange structure 18 is guided to the treating unit 10. In so far as certain features of my invention are concerned, the treating unit 10 may be given any suitable structural form to provide it with a product inlet adjacent its axis of rotation and a product outlet at a greater radial distance from its axis, with an intervening space or zone or spaces or zones in which, under the action of the centrifugal forces set up in the forms of insect infestation by the rapid rotational movement given them by the treating unit, life in the insect forms is destroyed; in my above-mentioned applications, several such possible structural forms of treating unit are disclosed.

And for purposes of illustration, I have herein selected several of the various forms of the apparatus disclosed in my aforesaid applications and have shown them in the drawings modified to embody my present improvements. Thus, referring again to Figure 1, the treating unit 10 there shown comprises, as in my application Serial #321,680, a main carrier member 42 preferably and illustratively substantially frusto-conical and preferably formed integrally with the above mentioned hub 11. Carrier member 42 supports or has related to it one or more members to provide a corresponding number of spaces adjacent the hub for the reception of the product to be treated and open or exposed externally, preferably peripherally, for the discharge of the product. Thus I have shown in Figure 1 two frusto-conical elements 43 and 44 related to the carrier element 42 to provide two spaces 45 and 46.

Elements 43 and 44 are mounted upon the carrier member 42 in spaced relation to each other and to the carrier member 42 itself, and for this purpose the peripheral portions of all three members may be extended or flanged outwardly in planes at right angles to the axis of rotation to receive between them and at suitably peripherally spaced intervals spacer elements 47 conveniently taking the form of metal washers through which and through suitable holes in the flanged extensions of members 42, 43 and 44 extend bolts or studs 48. Thus, the studs 48 may be securely fitted or anchored in the carrier member 42, and the three members with interposed spacers are securely clamped together in accurate alignment with each other, as by the nuts 49 on the studs.

With the parts proportioned and dimensioned as described in my application, Serial No. 321,680, illustratively with the minimum and maximum radii of the treatment spaces 45 and 46 about 3½" and about 10½", respectively, and with the angle of inclination of the upper faces of these treatment spaces relative to the axis of rotation being on the order of 45°, effective destruction of life in the forms of insect infestation is achieved with a speed of drive on the order of 3450 R. P. M., the product entering the apparatus through the inlet passage 17 and being distributed between the treatment spaces 45 and 46, to be peripherally discharged at the peripheral open discharge ends of the treatment spaces.

As described in my said application, the particles of the product and also the forms of insect infestation entered into the treatment space or spaces, are set into rotary movement in curved twisted paths of increasing radius, the velocity of this movement being high enough so that the centrifugal forces exerted by the form or forms of insect life presses the form of insect life against the upper or outer bounding face of the treatment space at a pressure to effect a life-destroying crushing, mutilation or deformation. Due to the increasing radius of the path of movement the linear velocity increases and the pressure or force with which the form of insect life is by the centrifugal force it itself exerts correspondingly increased. Accompanying the above described described action is also an abrading or rubbing of the form of insect infestation against this bounding face of the treatment space.

As such life-destroying actions are taking place with respect to the forms of insect life, particles of the product are by the centrifugal forces they exert laid against and moved along this outer bounding face of the treatment space and a continuous progression of product particles, usually in the form of a turbulent layer, takes place from the inner entry ends of the treatment space or spaces to the peripheral discharge ends thereof. During such movement of the product, and with the elements of the treating unit made of a suitable metal, such as an aluminum alloy with their surfaces anodized, as described in my said applications, it is possible, at a given speed of drive and for a given type or character of product, to effect destruction of life in the forms of insect infestation without materially milling or breaking up the product; but at the same speed of drive and with a different product or with the same character of product and higher velocities, destruction of insect life may be accompanied by substantial milling or further breaking up of the product particles.

To effectively guard against such milling action in the treating unit itself and to achieve other advantages, such as making it unnecessary to suit the linear velocities of product particles and hence speed of drive for given radial dimensions to values below the breaking up or milling point, usually varying with the character of the product itself, I apply to the underfaces, as viewed in Figure 1, of the elements or members 43 and 44, and hence along their under frusto-conical surfaces, a layer of material indicated at 51, the material having the characteristic of cushioning the particles that are pressed against it by the centrifugal forces they exert and hence the material of layers 51 is preferably yieldable or resilient; a suitable material for this purpose is rubber of good tenacity and resiliency, such as rubber compound as is used in industry to protect surfaces from sand-blast. It may be bonded to the surfaces of the treating unit in any suitable manner, and preferably the exposed or treating surfaces are given a smooth finish. In thickness the layers 51 may be on the order of ¼" and where the treatment unit otherwise takes the form of that described in my application, Serial No. 321,680 as above described and as shown in Figure 1, the spacer elements 47 between adjacent members of the treating unit are of a thickness to give the treatment spaces 45 and 46 a dimension or thickness on the order of ⅛".

Accordingly, as the product particles and the forms of insect infestation progress, as above described, along the treatment spaces 45 and 46, they are pressed against the active or bounding face or surface of the treatment zone or zones, but with the active surface presented by a material such as the above mentioned rubber of the layers 51, the product particles are, in effect, cushioned and are not broken up or subjected to excessive milling, and the construction and action, thus protective against milling, are particularly advantageous where the product is of the character of farina, semolina, corn meal, etc. The various forms of insect infestation, however, and apparently due to their inherently different physical characteristics in contrast to the characteristics of the product particles, are effectively mutilated, deformed or crushed to destroy the life therein. Moreover, I have found that, apparently because of the materially higher co-efficients of sliding and rolling friction between the rubber elements 51 and the various forms of insect life as compared to those between metal and insect life stages, the rubbing or abrading action of the forms of insect life, pressed thereagainst by the centrifugal forces they exert, is intensified and so much so, that, for given radial dimensions such as those illustratively set forth above, the rate of drive of the treating unit may be materially reduced. Thus I have achieved dependable life-destroying action, utilizing the effect of this intensified abrading action, at speeds of drive reduced by one-half. Thus, for example, and recurring to the illustrative dimensional data above set forth, the speed of drive of the treating unit, instead of being 3450 R. P. M. where the lining or layer elements 51 are not employed, may be reduced to about one-half and hence 1750 R. P. M. where the treating unit embodies the elements 51 as in Figure 1.

With such materially reduced speed of drive and hence also correspondingly reduced peripheral velocities of the product particles, the latter exert lower centrifugal forces and hence are pressed against the faces of the yieldable elements 51, as they progress outwardly in curved paths of increasing radius, at lower pressures, and thus the tendency to break up or further mill the product particles is correspondingly reduced. The power requirement is also considerably reduced, as the product under treatment is accelerated to lesser velocity.

The material undergoing treatment emerges from the treatment spaces 45 and 46 at the peripherally open ends thereof, where it is discharged tangentially into the casing structure to be deflected and guided downwardly for discharge through the exit passageway 22; preferably I provide suitable means for preventing breaking-up or milling impact of the discharged product particles with the casing structure, for I have found that, particularly with certain dimensional and velocity relationships, it is possible to cause milling or breaking up of product particles as a result of letting them impact against the interior metal casing wall.

A preferred and convenient arrangement comprises a plurality of members 55 (Figures 1 and 2) preferably deformable under impact; preferably, they are made of a non-metallic yieldable or resilient material and conveniently of rubber of the same general characteristics as the rubber employed in the preferred form of the layer elements 51 of the treating unit. Members 55 which may be of a thickness on the order of ¼" are positioned in spaced relation circumferentially of the peripheral discharge ends or mouths of the treating spaces of the treating unit, being of a length in the direction of the axis of rotation of the treating unit on the order of that indicated in Figure 1, being sufficient to encompass the vertical spread of material as it is discharged from the treating unit. Their vertical end faces or edges are preferably rounded.

Members 55 are alined and spaced from each other so that any tangent as indicated, for example, at 56 in Figure 2, drawn from the peripheral discharge mouth or mouths of the treating unit intersects or strikes a member 55 and hence any particle discharge, in a general tangential direction, does not reach the interior metal wall of the casing, but instead is certain to be cast against a face of a member 55. Conveniently the latter, as indicated in Figure 2, are alined along respective radii drawn to the axis of rotation.

Members 55 are preferably arranged in depending relation and a convenient means for mounting them in the relationship above described and as indicated in Figures 1 and 2 comprises a depending annulus 57 preferably formed integrally with the upper casing section 16 and provided in its underface with slots 58 as is better shown in Figure 3, the above-mentioned radial alignment of the members 55 facilitating the milling of the slots 58 in the part 57. Slots 58 are of lesser width than the thickness of the members 55 so that, where the latter are made of a resilient material, their upper end portions, received respectively into the slots 58, expand or press outwardly against the walls of the slot and thus maintain the assembly of the members 55 to the part 57. Where the material is also stretchable, like rubber, the insertion of the upper ends of the members 55 in the slot 58 may be readily accomplished by stretching each upper end in the direction of its width as viewed in Figure 1, thus reducing the thickness for reception into the slot 58, whereupon, upon release, the material tends to return to normal and to expand against the walls of the slot, and thus hold itself assembled to the member 57.

With such an arrangement the product particles discharge tangentially from the treating unit at linear velocities which are directly proportional to the radial dimension of the treating unit and its speed of rotation, are prevented from impacting against the inside metal wall of the casing structure and from striking it with a breaking-up or milling impact, and instead they strike the yieldable material of the members 55, their energy, rather than breaking them up or tending to break them up, being dissipated in distorting the yieldable material of members 55 and in tending to flex the latter bodily in the direction of rotation of the treating unit and about the line of suspension thereof adjacent their upper ends. This bodily flexing may be aided to some extent by windage effects, giving the product-receiving faces of the members 55 an inclination or curvature in a direction also to tend to deflect the product particles downwardly into the lower portion of the casing structure.

Where, with this arrangement, the treating unit embodies also elements 51 so as to permit operation of the treating unit at a lesser speed of drive, the velocity at which the product particles are discharged from the treating unit is correspondingly less and the members 55 are subjected to a lesser burden.

Where the apparatus embodies a treating unit of the general type described in my application, Serial No. 395,030, wherein the treating space or spaces comprise several sections making angles to each other and to the axis of rotation, elements like the elements 51 of Figure 1 may be embodied in the manner indicated in Figure 4 herein. Thus, for simplicity of illustration the treating unit of Figure 4, generally indicated by the reference character 60 is shown as having one treatment space formed between a carrier member 61 that has a hub portion 11 by which it is related to the drive shaft portion 12ª in the manner described above in connection with Figure 1, and by a companion annular member 62; member 62 is carried by carrier member 61 by means of shouldered studs 63 rigidly fixed in member 61 and onto the upper end of which and in suitably stepped holes an inner ring portion 62ª of member 62 is received, suitable nuts 64 clamping the member 62 securely between them and the shoulders of the studs 63.

Faces 62ᵇ and 61ᵇ of members 62 and 61 are shaped substantially as shown in Figure 4 and form a converging annular entry mouth, into which the inner portion of the guiding flange 18 of the inlet passageway 17 projects, thus to lead the material to be treated to the treatment space which is generally indicated by the reference character 64 and which, as in my said application, comprises several sections.

Thus a section 64ª extends between companion frusto-conical faces 61ᶜ and 62ᶜ, followed by a section 64ᵇ formed by faces 61ᵈ and 62ᵈ which extend at right angles to the axis of rotation, thence follows a section 64ᶜ between frusto-conical faces 61ᵉ and 62ᵉ, then a section 64ᵈ between faces 61ᶠ and 62ᶠ followed by a section 64ᵉ between faces 61ᵍ and 62ᵍ, terminate in a peripherally open discharge mouth the faces of which are preferably parallel and extend at right angles to the axis of rotation.

As described in my said application, Serial No. 395,030, the active faces against which the forms of insect life and the product particles are pressed and progressed under the centrifugal forces they exert, are the faces 61ᶜ, 62ᵉ and 61ᵍ, but to these faces I apply, in a manner described above in connection with Figure 1, members 51ª, preferably of rubber as above described with respect to the members 51 and preferably also of appropriate thickness, say on the order of ¼", leaving effective treatment spaces 64ª, 64ᵈ and 64ᵉ of a width or thickness on the order of ⅛".

It is, therefore, against the faces of the cushioning members 51ª that the forms of insect infestation and particles of the product are pressed and progressed by exerted centrifugal forces as described in detail in my said application, but with the elements 51ª in the sections of the treatment space or spaces, breaking up or milling of the product particles is counteracted and effective destruction of life in the insect forms achieved by actions such as those described above in connection with Figure 1, it being noted that here again I am enabled to operate the treating unit, for given comparable radial dimensions at materially reduced speed of rotation. The discharged material may, as with the arrangement of Figure 1 be brought into coaction with pendent members 55 as shown in Figure 4, the latter being constructed, mounted and arranged as described in connection with Figure 1.

Figure 5:
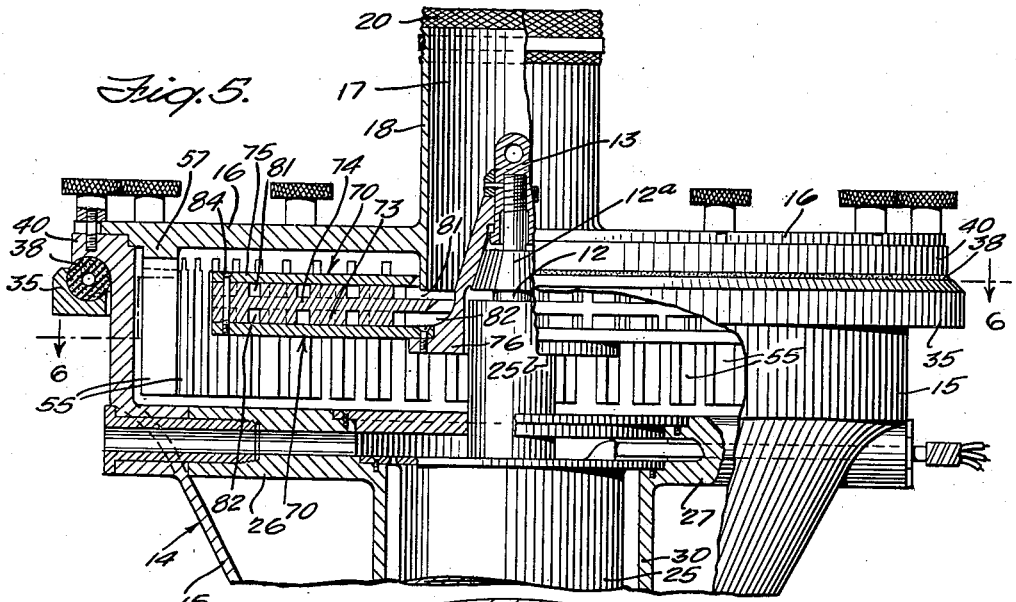
Figure 5 is a view like that of Figure 1, with certain parts omitted, showing another form of apparatus.
Figure 6:
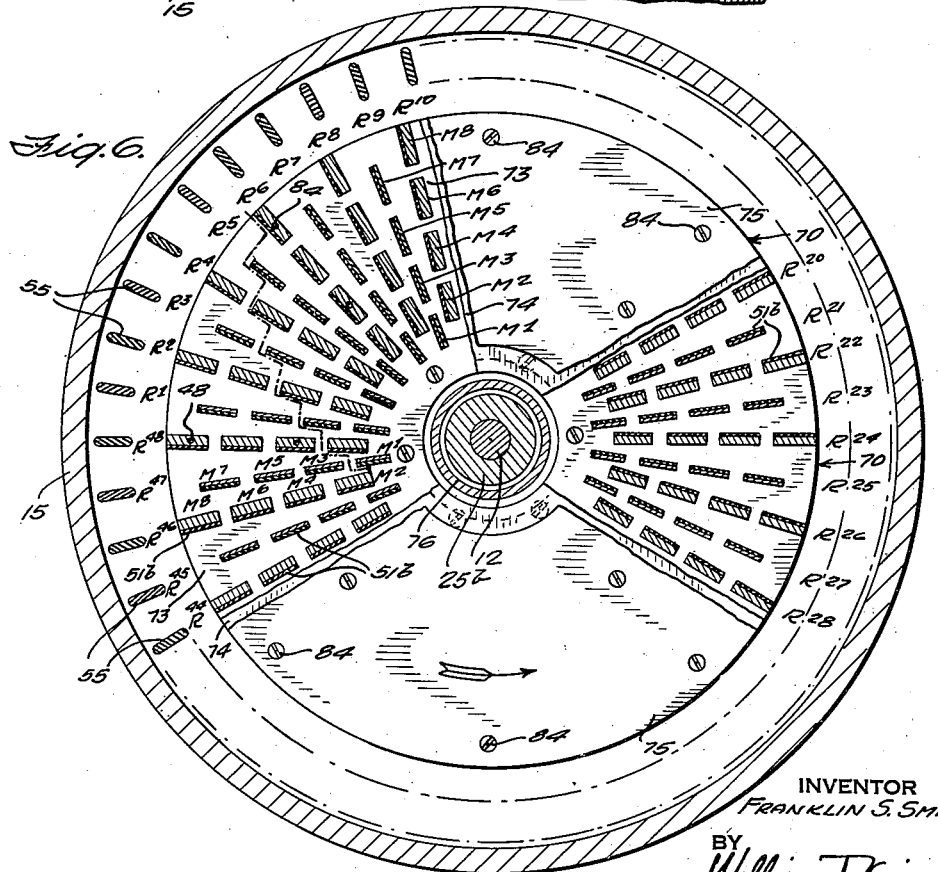
Figure 6 is a horizontal sectional view as seen along the line 6—6 of Figure 5.

By way of further illustration I have shown in Figures 5 and 6 a preferred embodiment of my invention with respect to the type of apparatus disclosed in my copending application, Serial No. 345,715, to which reference may be made for the details of construction. As shown in my co-pending application, the treating unit, generally indicated in Figures 5 and 6 by the reference character 70 comprises three annular plate members 73, 74 and 75, providing therebetween two annular spaces 81 and 82. These plate members are held in spaced relation by spaced rows $R^2$, $R^4$, $R^6$, $R^8$—$R^{48}$ of four members $M^2$, $M^4$, $M^6$ and $M^8$ equi-distantly spaced from each other and projecting upwardly and integrally formed with the plate member 74 and by similarly equi-angularly spaced rows $R^2$, $R^4$, $R^6$—$R^{48}$ of four members $M^2$, $M^4$, $M^6$ and $M^8$ projecting downwardly from and integrally formed with the plate member 74. Plate member 73 rests against the lower end faces of all of the members $M^2$, $M^4$, $M^6$ and $M^8$ and is provided with a corresponding number of equi-angularly spaced rows of members $M^1$, $M^3$, $M^5$ and $M^7$ integrally formed therewith and of a height to contact the underface of plate member 74, being received as is better shown in Figure 6, midway between successive pairs of rows $R^2$, $R^4$, $R^6$—$R^{48}$. Upper plate member 75 is correspondingly formed, being provided with similarly equi-distantly spaced rows $R^1$, $R^3$, $R^5$—$R^{47}$ of rows of members $M^1$, $M^3$, $M^5$ and $M^7$, the latter being of a downward extent to engage the upper face of plate member 74 and extending, respectively, midway between successive pairs of rows $R^2$, $R^4$, $R^6$—$R^{48}$ of the upwardly projecting members $M^2$, $M^4$, $M^6$ and $M^8$ of plate member 74.

The three elements 73, 74 and 75 are secured together as by screws 84 and may as a unit be secured to a hub member 76 secured to the shaft portion 12ª preferably in the manner described above in connection with Figure 1, and as indicated in Figure 5.

And as shown in Figure 5 the downwardly projecting portion of flange 18 of the inlet passageway 17, in coaction with the outer face of hub 76 guides the product to be treated to the inner open annular ends of the two treatment spaces 81 and 82, to which the product is preferably substantially equally distributed as described in my said application.

As is better shown in Figure 6, and assuming that the treating unit rotates in counter-clockwise direction, the leading faces of members $M^1$, $M^2$, $M^3$, $M^4$—$M^8$ make an angle to the radius drawn from the axis of rotation to any point in the leading face, and where the members have parallel leading and trailing faces this angularity may be achieved by placing the trailing faces along a radius; hence, any particle of the insect infested product that is at any moment in engagement with a leading face, with the treating unit rotating counter-clockwise, reacts against the leading face with a force or pressure which, due to the above-mentioned angularity, has a component one of which is normal to the leading face and the other of which is coincident with the leading face but extends in an outward direction toward the outer periphery of the treating unit. Due to this latter component and its direction, any particle partakes of movement in an outward direction along a leading face while being pressed against it with a force or pressure represented by the component that is normal to the leading face.

As is better shown in Figure 6, the gaps between the members of each row have juxtaposed to them, though circumferentially spaced therefrom, a member of the next succeeding row. Members $M^1$, $M^2$—$M^8$ may have a vertical dimension of ½", their length radially may be ¾", the gaps G may be about ⅛" in general radial dimension and the diameter of the treating unit may be on the order of 13".

In operation, as described in my said application, with the treating unit dimensioned as just stated and driven at a speed on the order of 3450 R. P. M., several actions take place to effect destruction of life in the forms of insect infestation. Thus, the linear velocity of the leading faces of any member $M^1$, $M^2$—$M^8$ is sufficiently high to cause particles of the product and of the insect infestation to be pressed against the leading face thereof by a force or pressure represented by the above-mentioned normal or right angled component and at the same time the outwardly directed component causes the particles to slide along the leading face and thus to increase the radial distance from the axis of rotation, with resultant increase in linear velocity and corresponding increase in the two components, the travel along the leading face being thus accompanied by an increase in the force with which any particle is pressed against the leading face. And these effects are increasingly intensified with increase in distance of the particular member from the axis of rotation.

The progression of any particle of insect life along any leading face is thus accompanied by a rubbing or abrading action, taking part in destroying life therein. But when such a particle reaches the end edge of a member and hence reaches the gap G, it loses velocity and is overtaken by the leading face of the member juxtaposed to the gap G, being a member in the next succeeding row; the overtaking member which, relative to the particle, is travelling at a higher velocity, thus strikes the particle with a substantial impact, giving a crushing effect upon the forms of insect infestation, and effecting destruction of life therein.

By the time a particle emerges to be tangentially discharged from the treating unit, it has been subjected to the rubbing action along the leading faces of a succession of members and to a succession of impacts according to which and how many gaps G it passed through in making the transition from the entry end of the treating unit to the discharge end and in Figure 2 is indicated by a broken zig-zag line a possible path taken by such a particle.

It is possible, particularly under certain conditions and with certain products, to have such actions as those just described effect a substantial milling or breaking up of the product particles themselves and according to my invention I provide the leading faces of the members $M^1$, $M^2$—$M^8$ with a material like that of the members 51 of Figure 1, or of members $51^a$ of Figure 4, as indicated at $51^b$ in Figure 6, elements $51^b$ being preferably of rubber as above described. With the higher co-efficient of friction of elements $51^b$ as compared to the metal, such as anodized aluminum of the members $M^1$, $M^2$—$M^8$ of my said co-pending application, the rubbing action upon the forms of insect life as they are progressed along the leading face of an element $51^b$ is materially enhanced and as is also the life-destroying distortion, mutilation or deformation of the form of insect life, but due to such reasons as pointed out above in connection with Figures 1 and 4, breaking up or milling of the product particles can be thus appreciably counteracted. Due apparently to the different physical nature of the forms of insect life and the product particles, the impact of an element $51^b$ against a product particle released through a gap G is not a violent breaking-up or milling impact though the impact therewith of the form of insect life is nevertheless a deforming or mutilating impact, and again appreciable action to effect further milling of the product particles may be counteracted. Also I am enabled to achieve dependable destruction of life in the forms of insect infestation and also prevent milling of the product, while operating the treating unit of Figures 5 and 6 illustratively dimensioned as above described, at a speed of drive materially less than say 3450 R. P. M., and may in effect cut that speed of drive in half. Here again, the enhanced action achieved by elements $51^b$ in effecting life-destroying crushing or mutilation of forms of insect life makes it possible to operate at lower peripheral velocities by which also the product particles benefit in that the forces tending to break them up are correspondingly reduced.

As in the arrangement of Figure 1, I prefer to employ elements 55 in the apparatus of Figure 5, spaced about in the region of discharge of product from the treating unit 70, to coact therewith in counteracting the milling action that might otherwise take place as, for example, by impacting the discharged particles against the interior metal walls of the casing structure. In Figures 5 and 6, the elements 55 are shown related to the treating unit in the manner described above in connection with Figure 1 and from which the action and coactions thereof will be clear.

Where the material of the elements 55 is of a non-rigid character, the rapidly moving product particles dissipate their energy not in breaking up the particles, but in deforming the material itself. Some materials, such as certain so-called synthetic rubbers, which may have a slow rate of recovery upon deformation can be employed through preferably the materials that have a high rate of recovery and hence have good resiliency, like rubber compounds and like certain synthetic rubbers are utilized. Also, the material of the elements 55 may, as in the illustrative embodiment, be of characteristics to be bodily deformable, as by bending or flexing, under the impacts of the product particles, the energy of the latter dissipating itself in part at least in effecting such deformation.

Though in the foregoing I have mentioned, as a preferred embodiment, rubber compound as the material for the elements 51, $51^a$, $51^b$, it will be understood that other materials than rubber compound as such may be employed to good effect, such as synthetics like those above mentioned. By way of further example, abrasion-resistant materials such as rubber-asbestos compounds or other compounds such as are used for brake linings, or other materials having good co-efficients of sliding and rolling friction between them and the various forms of insect life as compared to those between metal and insect life stages may be employed.

Thus it will be seen that there has been provided in this application a method and apparatus in which the various objects hereinabove set forth together with many thoroughly practical advantages are successfully achieved. It will be seen that effective destruction of life in the forms of insect infestation is made possible at lower peripheral velocities and hence at lower rotary speeds of the treating unit, and at lower power requirements, and that milling of the product particles is prevented or made substantially inappreciable in a simple and inexpensive manner, a manner adaptable, as above indicated by the illustrative three embodiments, to various forms of treating unit, such as those disclosed in my above mentioned applications. And where, for given radial dimensions, my invention is utilized to operate the treating unit at lower rotary speeds, other desirable advantages and coactions may be realized; for example, with lower rotary speeds, the effect of a condition or conditions of unbalance in the treating unit is greatly reduced, virtually inversely as the square of the linear velocity, and thus the burden of the structural arrangement above described for overcoming or counteracting conditions of unbalance is materially reduced, with corresponding mechanical advantage in the construction of the apparatus in its entirety. Moreover, the apparatus will be seen to be well adapted to meet the widely varying conditions of practical use.

As many possible embodiments may be made of the mechanical features of the above invention and as the art herein described might be varied in various parts, all without departing form the scope of the invention, it is to be understood that all matter hereinabove set forth, or shown in the accompanying drawings is to be interpreted as illustrative and not in a limiting sense.

I claim:

1. An apparatus for treating a product comprising a casing structure having an inlet passageway and an outlet passageway, a rotary product-treating means within said structure having inlet means adjacent its axis of rotation for receiving the particles of the product to be treated and having outlet means at a greater radius than said inlet means for peripherally discharging the product particles by the centrifugal forces they exert in response to the rotary movement given them by said rotary means, and a plurality of sheets supported by said casing structure about said rotary means and circumferentially spaced from each other with their faces extending at a substantial angle to the tangential paths of discharge of product particles from said rotary means.

2. In apparatus for effecting the destruction of all insect life in a flowable product composed of individual solid parts, the combination of, a rotary treating device having a cushioning and frictional treating surface against which the product and insect life engages during the treatment, confining means associated with said device and forming a treating space confined to the dimensions of said device and having an inlet forming a substantially unrestricted passageway to allow a substantially even stream of said product to flow freely to said treating space, the smallest dimension of said treating space being larger than the maximum dimension of the individual parts of said product, means to feed said product to said inlet so that it may flow through said treating space, and means to rotate said treating device at a high speed to provide a life destroying engagement between every individual particle of said insect life and said treating surface during passage of said product through said treating space, said apparatus including a product outlet extending substantially around said treating device through which the product falls away from said treating device.

3. In apparatus for effecting the destruction of all insect life in a flowable product composed of individual solid parts, the combination of, a rotary treating device having two opposed axially spaced surfaces defining a treating space, at least one of said surfaces against which the product and insect life engages during the treatment being cushioning and frictional, the smallest dimension between said surfaces being larger than the largest of said parts of said product, there being at the central portion of the device an inlet forming a substantially unrestricted passageway to allow a substantially even stream of said product to flow freely to said treating space, means to feed said product to said inlet, and means to rotate said rotary device to flow the product outwardly through said treating space by centrifugal force and to provide a life destroying engagement between said last mentioned surface and every individual particle of insect life in the product.

4. Apparatus as claimed in claim 2, in which means formed of yieldable material are interposed in the path of the product particles discharged from said rotary treating device for cushioning them against substantial breakage upon impact with a part of the apparatus.

5. Apparatus as claimed in claim 2, in which means are provided for preventing substantial breakage of discharged particles of the product, said means comprising a plurality of flexible members positioned in the paths of movement of the product particles discharged from said rotary treating device whereby the energy of motion of said particles is dissipated in flexing said flexible members.

6. In apparatus for effecting the destruction of all insect life in a flowable product composed of individual solid parts, the combination of, product-directing means, a frusto-conical rotary treating device having an interior cushioning and frictional surface of a form generated by the rotation of a straight line about the axis of rotation, said device having a central inlet adapted to receive the product from said product-directing means so that the product is directed along said treating surface, said product-directing means and said inlet forming a substantially unrestricted passageway to allow a substantially even stream of said product to flow freely to said treating surface, and means to rotate said treating device at a speed to cause the product to move along said interior treating surface and to be pressed thereagainst during such movement to inflict lethal trauma on all insect life in said product.

7. Apparatus as claimed in claim 1 in which the sheets are yieldable.

8. Apparatus as claimed in claim 1 in which the sheets are connected to the casing structure at one end only so that the free ends thereof may yield upon impact.

9. In apparatus for effecting the destruction of all insect life in a flowable product composed of individual solid parts, the combination of, a rotary treating device having a rubber treating surface against which the product and insect life engage during the treatment, confining means associated with said device and forming a treating space confined to the dimensions of said device and having an inlet forming a substantially unrestricted passageway to allow a substantially even stream of said product to flow freely to said treating space, the smallest dimension of said treating space being larger than the maximum dimension of the individual parts of said product, means to feed said product to said inlet so that it may flow through said treating space, and means to rotate said treating device at a high speed to provide a life destroying engagement between every individual particle of said insect life and said treating surface during passage of said product through said treating space, said apparatus including a product outlet extending substantially around said treating device through which the product falls away from said treating device.

10. In apparatus for effecting the destruction of all insect life in a flowable product composed of individual solid parts, the combination of, a rotary treating device having two opposed axially spaced surfaces defining a treating space, at least one of said surfaces against which the product and insect life engage during the treatment being formed of rubber, the smallest dimension between said surfaces being larger than the largest of said parts of said product, there being at the central portion of the device an inlet forming a substantially unrestricted passageway to allow a substantially even stream of said product to flow freely to said treating space, means to feed said product to said inlet, and means to rotate said rotary device to flow the product outwardly through said treating space by centrifugal force and to provide a life destroying engagement between said last mentioned surface and every individual particle of insect life in the product.

FRANKLIN S. SMITH.